United States Patent

[11] 3,609,018

| [72] | Inventor | Michael Marolla<br>Fort Lauderdale, Fla. |
|---|---|---|
| [21] | Appl. No. | 1,401 |
| [22] | Filed | Jan. 8, 1970 |
| [45] | Patented | Sept. 28, 1971 |
| [73] | Assignee | Paramount Optical Mfg. Corp.<br>Woodside, N.Y. |

[54] SPECTACLES HAVING RESILIENTLY CLOSED LENS RIMS
3 Claims, 5 Drawing Figs.

| [52] | U.S. Cl. ..................................................... | 351/95, 351/92 |
| [51] | Int. Cl. ....................................................... | G02c 1/08 |
| [50] | Field of Search........................................... | 351/92, 95, 97, 99, 140, 83 |

[56] References Cited
UNITED STATES PATENTS

| Re.3,725 | 11/1869 | Noel.............................. | 351/95 |
| 2,998,610 | 9/1961 | Spero............................. | 351/97 UX |
| 3,145,254 | 8/1964 | McCulloch..................... | 351/113 UX |
| 3,473,869 | 10/1969 | Pluznik et al. ................. | 351/95 |

FOREIGN PATENTS

| 18,692 | 1893 | Great Britain................ | 351/95 |
| 22,036 | 1906 | Great Britain................ | 351/95 |
| 428,481 | 6/1911 | France .......................... | 351/95 |

*Primary Examiner*—David Schonberg
*Assistant Examiner*—John W. Leonard
*Attorney*—William R. Liberman ABSTRACT: A replaceable lens spectacle structure comprises lens rims which are split at their outer sides to delineate opposite relatively movable frame portions terminating in outwardly directed apertured ears. A guide rod having enlarged end heads slidably engages the ears and a U-shaped spring has openings in its legs engaging the guide rod and is trapped between one of the ears and a guide rod end head resiliently to close the rim. Each closure assembly is masked by a laterally projecting masking plate mounted on a portion of the rim in front of the rim closure assembly and a temple piece is hinged to the plate.

PATENTED SEP 28 1971  3,609,018

INVENTOR
MICHAEL MAROLLA
BY
William R. Liberman
ATTORNEY

SPECTACLES HAVING RESILIENTLY CLOSED LENS RIMS

BACKGROUND OF THE INVENTION

The present invention relates generally to improvements in spectacles and it relates particularly to an improved spectacles lens-mounting structure which facilitates the application and replacement of the spectacle lenses.

The application or mounting of lenses in the conventional spectacle frame or the replacement of such lenses are generally awkward and time-consuming procedures requiring a high degree of skill and frequently necessitates the use of special tools or equipment. Numerous types of spectacle frame structures have been proposed to facilitate the insertion or replacement of the lenses but these possess numerous drawbacks and disadvantages. They are complicated and unattractive mechanisms, of little versatility and adaptability and generally are inconvenient to use and unreliable, and otherwise leave much to be desired.

SUMMARY OF THE INVENTION

It is a principal object of the present invention to provide an improved spectacles frame structure.

Another object of the present invention is to provide a spectacles frame having an improved lens-mounting structure.

Still another object of the present invention is to provide an improved spectacles lens mount structure wherein the lenses may be easily and rapidly mounted, removed and replaced.

A further object of the present invention is to provide an improved spectacles lens mount structure of the above nature characterized by its reliability, simplicity, adaptability and attractive appearance.

The above and other objects of the present invention will become apparent from a reading of the following description taken in conjunction with the accompanying drawing which illustrates a preferred embodiment thereof.

In a sense, the present invention contemplates the provision of a spectacles structure comprising a pair of laterally spaced rims and a ridge member extending between and connecting said rims, each of said rims being split along an outer section thereof to delineate opposite relatively movable first and second rim elements, the improvement comprising means for resiliently closing each of said rims including a guide member engaging said first rim leg proximate the free end thereof, a follower mounted on and movable with said second rim leg proximate its free end and slideably engaging said guide member, and spring means resiliently urging said follower along said guide member in a direction to close said respective rim.

According to a preferred form of the improved spectacles the rim elements adjacent the split terminate in outwardly directed parallel-spaced ears provided with aligned apertures. A guide rod slideably engages the ear apertures and has enlarged end heads. A U-shaped spring has opposite resilient legs provided with apertures engaging the guide rod and the spring is entrapped between an ear and on of the rod end heads to urge the rim elements resiliently toward each other to a rim-closed position. A bracket is mounted on one of each pair of rim mask elements adjacent the split to the rim-locking mechanism, and temple pieces are hinged to the brackets.

The lenses, which are advantageously beveled along their peripheries, are easily mounted in the rim by inserting one side thereof into engagement with one side of the rim and then pressing edges of the lens outwardly therefrom into the rim, successively to spread and then to release the rim legs whereby the rim firmly engages the lens. The lens may be separated from the rim by reversing the above procedure. The improved structure of the present invention permits the easy, reliable and rapid mounting of the lens with a minimum of skill and without the necessity for using any tools.

DESCRIPTION OF THE PREFERRED EMBODIMENT

Figure 1:
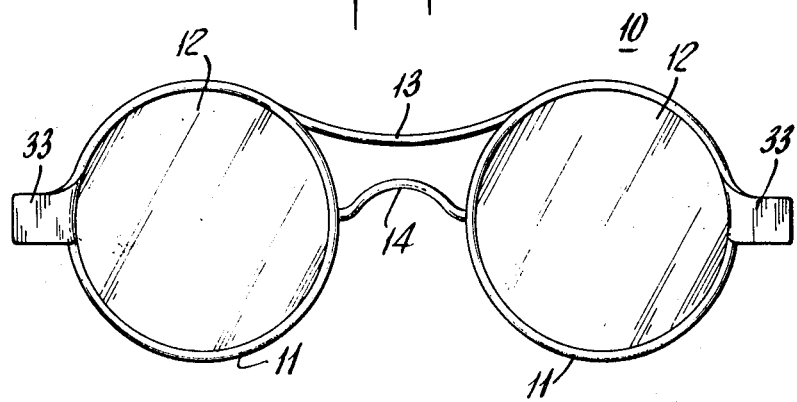
FIG. 1 is a front elevational view of a spectacles embodying the present invention.

Referring now to the drawing which illustrates a preferred embodiment of the present invention, reference numeral 10 generally designates the improved spectacles which are illustrated as of the circular lens type, it being understood that the improved spectacles may be constructed for use with lenses of any desired shape. While spectacles 10 are advantageously formed of metal, they may be formed of any suitable material and include a pair of laterally spaced similar symmetrical rims 11 which releasably engage correspondingly shaped mating lenses 12. Rims 12 are joined at their upper inner peripheries by a laterally extending connector 13 and are joined shortly above their medial inner peripheries by a suitably shaped bridge member 14.

Each rim 11 is of circular shape or of a shape corresponding to that of lens 12 and is of channel shape or is otherwise provided with a lens edge engaging inner peripheral groove 15, and is formed of a flexible material, advantageously a flexible metal. Rim 11 is radially split at its medial outer perimeter to delineate upper and lower peripherally aligned rim elements 16 and 17 respectively. Affixed to the lower end of upper rim element 16 is radially outwardly directed ear 18 having a circular aperture 19 and affixed to the upper end of lower rim element 17 is a radially outwardly directed ear 20 substantially parallel to ear 18 and having a circular aperture 21 in axial alignment with aperture 19.

A rivet 22 includes a guide-rod-defining shank 23 slideably engaging apertures 19 and 21 and includes an enlarged upper head 24 and its lower end is upset or swaged to form a bottom enlarged head 26 engaging the underface of ear 20. A washer 27 engages guide rod 23 and underlies head 24.

Figure 2:
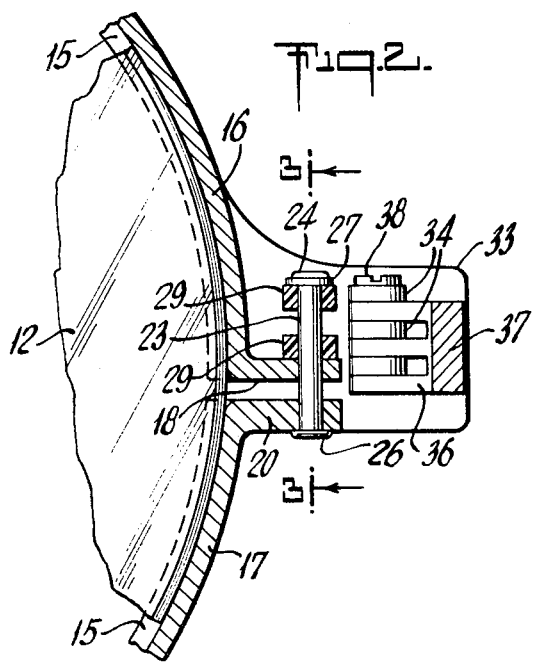
FIG. 2 is an enlarged rear longitudinal sectional view showing the lens rim closure structure in lens-engaging closed condition.
Figure 3:
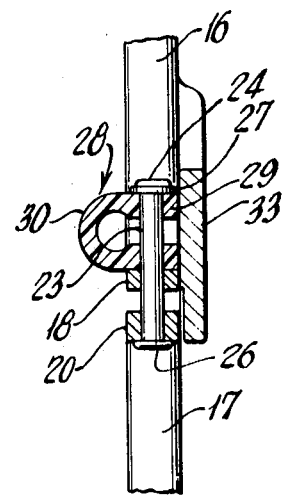
FIG. 3 is a sectional view taken along line 3—3 in FIG. 2.
Figure 4:
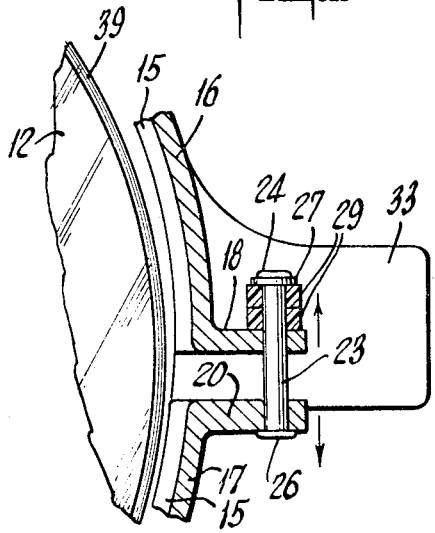
FIG. 4 is a view similar to FIG. 2 showing the rim in an open lens-disengaging condition.
Figure 5:
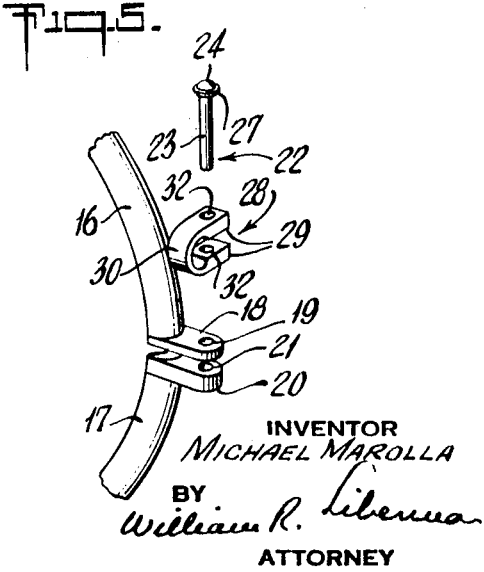
FIG. 5 is an exploded perspective view of the rim closure mechanism.

A U-shaped compression spring member 28 is formed of a suitable resilient material, advantageously nylon, and includes a pair of vertically spaced parallel arms 29 resiliently joined by an integrally formed arcuate crosspiece 30 of reduced transverse cross section. Spring legs 30 are provided with aligned apertures 32 which slideably engage guide rod 23, spring member 28 being entrapped between washer 27 and the upper face of ear 18, spring legs 29 bearing on these members to urge rod 23 and ear 20 resiliently upwardly relative to ear 18 and thereby resiliently to urge rim legs 16 and 17 toward each other and rim 11 to a closed condition, as seen in FIGS. 2 and 3.

A suitably shaped and decorated bracket-defining plate 33 is affixed to the front end section of rim leg 16 and is directed outwardly therefrom and depends below the lower end of leg 16. Bracket plate 33 is disposed in front of and masks the assembly including ears 18 and 20, spring 28 and rivet 22, and extends outwardly of this assembly. A first multiple knuckle hinge section 34 is affixed to the rear face of bracket 33, outwardly of ears 18 and 20, and a mating hinge section 36 secured to a temple piece 37 of conventional construction engages hinge section 34 and is swingably secured thereto by a pivot pin screw 38. Thus, the spectacles temple pieces are hinged to the spectacles frame without interference with the rim-locking assemblies.

Lens 12 employed with the improved spectacles frame is provided with a bevelled peripheral edge 39 which advantageously complements the inside peripheral channel or groove 15 of the respective rim 11. In mounting a lens 12 in a rim 11, the lens is inclined to the plane of rim 11 and one portion of lens 12 is inserted into engagement with rim groove 15. The lens 12 is then pressed toward the plane of rim 11, around the margin of the lens from the point of engagement, the edge of the lens bearing on the inside edge of rim 11 to expand rim 11 and to spread rim legs 16 and 17, simultaneously compressing spring 28. Upon lens 12 being brought into full registry with rim 11, the rim, under the influence of spring 28 urging the rim elements together, returns or snaps to its closed condition tightly and firmly to engage and support the lens 12. The lens 12 may be separated from the rim by reversing the above procedure.

While there has been described and illustrated a preferred embodiment of the present invention it is apparent that numerous alteration, omissions and additions may be made without departing from the spirit thereof.

I claim:

1. In a spectacles structure comprising a pair of laterally spaced lens-retaining rims and a bridge extending between and connected to said rims, each of said rims being split along an outer section thereof to delineate opposite relatively movable first and second rim elements and having an outwardly directed first ear mounted on the free end of said first rim element, the improvement comprising means for normally resiliently closing each of said rims including a vertically elongated guide member engaging said first rim ear element proximate the free end thereof, a follower comprising an outwardly directed apertured second ear mounted on and movable with said second rim element proximate its free end and substantially parallel to and spaced from said first ear and slideably engaging said guide member, said guide member extending from said first ear and projecting through said aperture in said second ear and terminating in an enlarged head, and spring means, said spring means comprising a U-shaped compression spring formed of resilient material and including a pair of spaced-parallel legs having apertures formed therein engaging said guide and trapped between said follower and said enlarged head resiliently urging said follower along said guide member in a direction to bring together the rim elements and to close said respective rim.

2. The spectacles structure of claim 1, including a bracket plate mounted on each of said second rim elements and projecting laterally outwardly in front of and masking said rim closure means, and a temple hinged to each of said bracket plates.

3. The spectacles structure of claim 2, wherein said temple pieces are hinged to the rear faces of said bracket plates laterally outwardly of said rim closure means.